United States Patent
Lee et al.

(10) Patent No.: US 7,672,680 B1
(45) Date of Patent: Mar. 2, 2010

(54) WEB SERVICES ARCHITECTURE SYSTEM AND METHOD

(75) Inventors: Wing K. Lee, Overland Park, KS (US); Ashim Prasad, Overland Park, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 494 days.

(21) Appl. No.: 11/225,697

(22) Filed: Sep. 13, 2005

(51) Int. Cl.
*H04W 24/00* (2006.01)

(52) U.S. Cl. .............. 455/456.5; 455/456.1; 455/456.2; 455/456.3

(58) Field of Classification Search .................. 455/99, 455/345, 412.1, 418, 456.1, 456.2, 456.3, 455/456.5, 456.6, 457, 566, 569.2; 701/200, 701/207, 208, 211, 213; 340/988, 990, 995.1, 340/995.12, 995.14, 995.24
See application file for complete search history.

(56) References Cited

U.S. PATENT DOCUMENTS

| | | | | |
|---|---|---|---|---|
| 5,442,553 | A | * | 8/1995 | Parrillo ....................... 455/420 |
| 5,818,356 | A | * | 10/1998 | Schuessler ............. 340/995.12 |
| 5,832,394 | A | * | 11/1998 | Wortham ....................... 701/1 |
| 6,028,537 | A | * | 2/2000 | Suman et al. ............... 340/988 |
| 6,138,072 | A | * | 10/2000 | Nagai .......................... 701/207 |
| 6,202,022 | B1 | * | 3/2001 | Ando ......................... 701/200 |
| 6,405,033 | B1 | * | 6/2002 | Kennedy et al. .......... 455/414.1 |
| 6,711,474 | B1 | * | 3/2004 | Treyz et al. ..................... 701/1 |
| 6,754,485 | B1 | * | 6/2004 | Obradovich et al. ...... 455/414.1 |
| 2001/0044310 | A1 | * | 11/2001 | Lincke ........................ 455/456 |
| 2002/0032035 | A1 | * | 3/2002 | Teshima ..................... 455/456 |
| 2002/0037732 | A1 | * | 3/2002 | Gous et al. .................. 455/502 |
| 2004/0203611 | A1 | * | 10/2004 | Laporta et al. ........... 455/412.1 |
| 2005/0272443 | A1 | * | 12/2005 | Hose et al. ............... 455/456.1 |

OTHER PUBLICATIONS

Kerihuel, J.b. & Martin, M., How the intelligent network will federate services related to mobility, Third IEE Conference on Telecommunications, 1991, publication date: Mar. 17-20, 1991, pp. 7-11.*

* cited by examiner

*Primary Examiner*—Joseph H Feild
*Assistant Examiner*—Huy D Nguyen

(57) ABSTRACT

The present disclosure is directed to a web services architecture comprising a component operable for rapid development of a web services application, a mobile application. The web services architecture also includes a telecommunications provider system and a service provider. The mobile application is related to the web services application deployable on a mobile device. The telecommunications provider system is operable to host the web services application and to identify the mobile device and federate information related to the mobile device. The service provider is operable to provide a mobile device service associated with the web services application. The service provider is in communication with the web services application and operable to use the federated information related to the mobile device to provide application services to the mobile device.

17 Claims, 2 Drawing Sheets

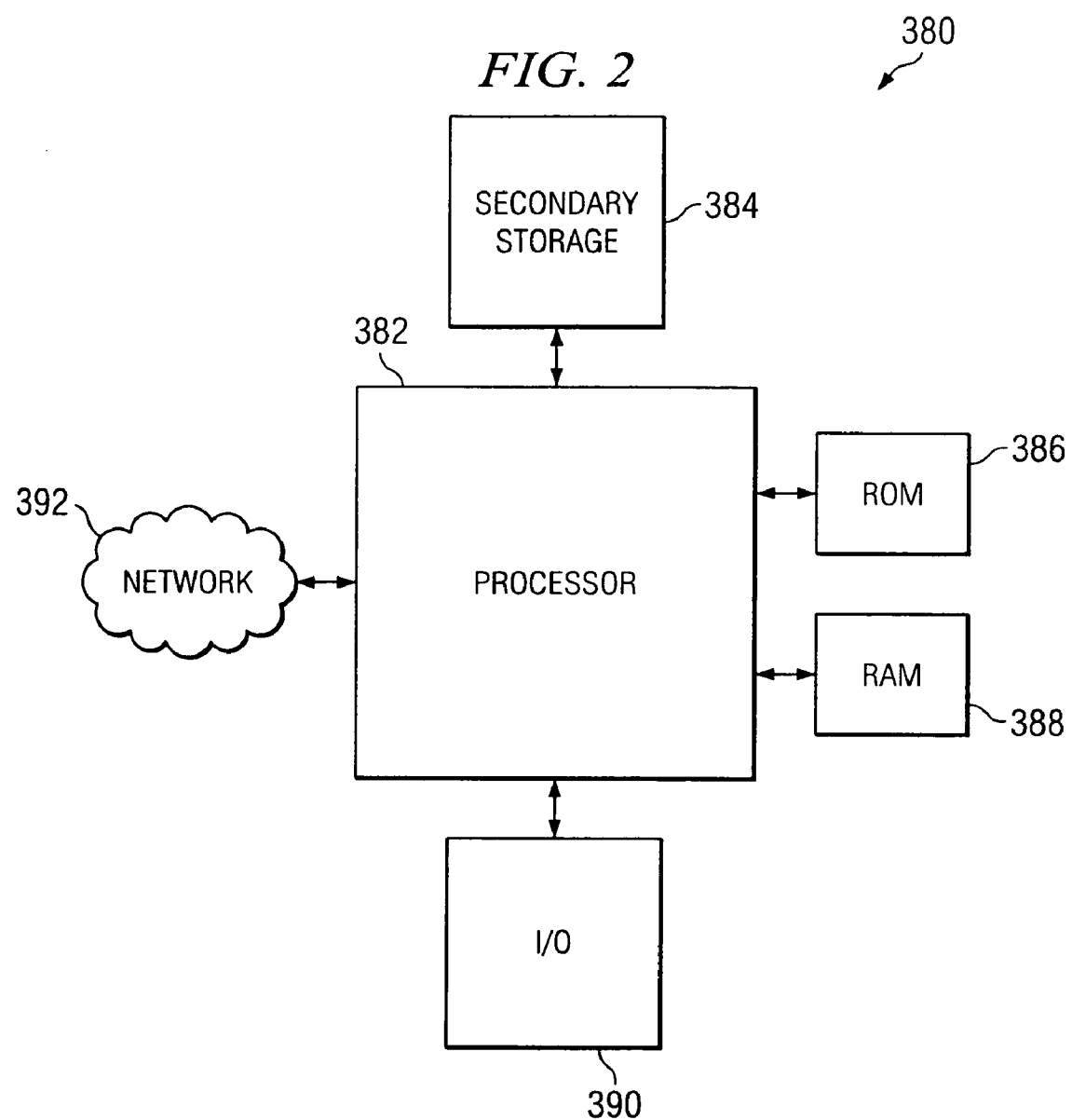

WEB SERVICES ARCHITECTURE SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to providing telecommunication web services to mobile devices, and more particularly, but not by way of limitation, to web services architecture systems and methods.

BACKGROUND OF THE INVENTION

The increasing popularity of network computing and the shift away from the use of standalone computer applications have significantly changed the means by which computer software is developed and distributed. Software developers face a new set of challenges and require new tools to create applications and manage dataflow across a variety of computer systems. Web services combine a diverse set of software components to deliver custom functionality to customers. Significant architectural issues must be addressed during development of web services for interaction to take place and data to flow properly between the components of a web service and between various different web services.

SUMMARY OF THE INVENTION

According to one embodiment, the present disclosure is directed to a web services architecture comprising a component operable for rapid development of a web services application. The architecture also includes a mobile application, a telecommunications provider system and a service provider. The mobile application is related to the web services application deployable on a mobile device. The telecommunications provider system is operable to host the web services application, and to identify the mobile device and federate information related to the mobile device. The service provider is also operable to provide a mobile device service associated with the web services application. The service provider is in communication with the web services application and operable to use the federated information related to the mobile device to provide the mobile device service to the mobile device.

According to another embodiment, the present disclosure is directed to a web services architecture comprising a telecommunications provider system, a service provider and a mobile application. The telecommunications provider system is operable to host a web services application using one or more web services components, to identify a mobile device and federate information related to the mobile device. The service provider is operable to provide a mobile device service associated with the web services application, the service provider in communication with the web services application and operable to use the federated information related to the mobile device to provide the mobile device service to the mobile device. The mobile application is operable on the mobile device, is related to the web services application and the mobile application using a time component associated with the mobile device for the mobile device service.

According to another embodiment, the present disclosure is directed to a method for enabling web services for partners of a telecommunications provider. The method comprising providing a location based web service and identifying a mobile device by a telecommunications network. The method includes providing identity information associated with the mobile device to the web services partner and providing time information to the web services partner. The time information is related to at least one of the mobile device and the telecommunications network. The method also includes the partner providing a service related to the web service to a customer of the mobile device based on the identity information and the time information.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 2 illustrates an exemplary general purpose computer system suitable for implementing several embodiments of the disclosure.

DETAILED DESCRIPTION OF THE PREFERRED EMBODIMENTS

Figure 1:
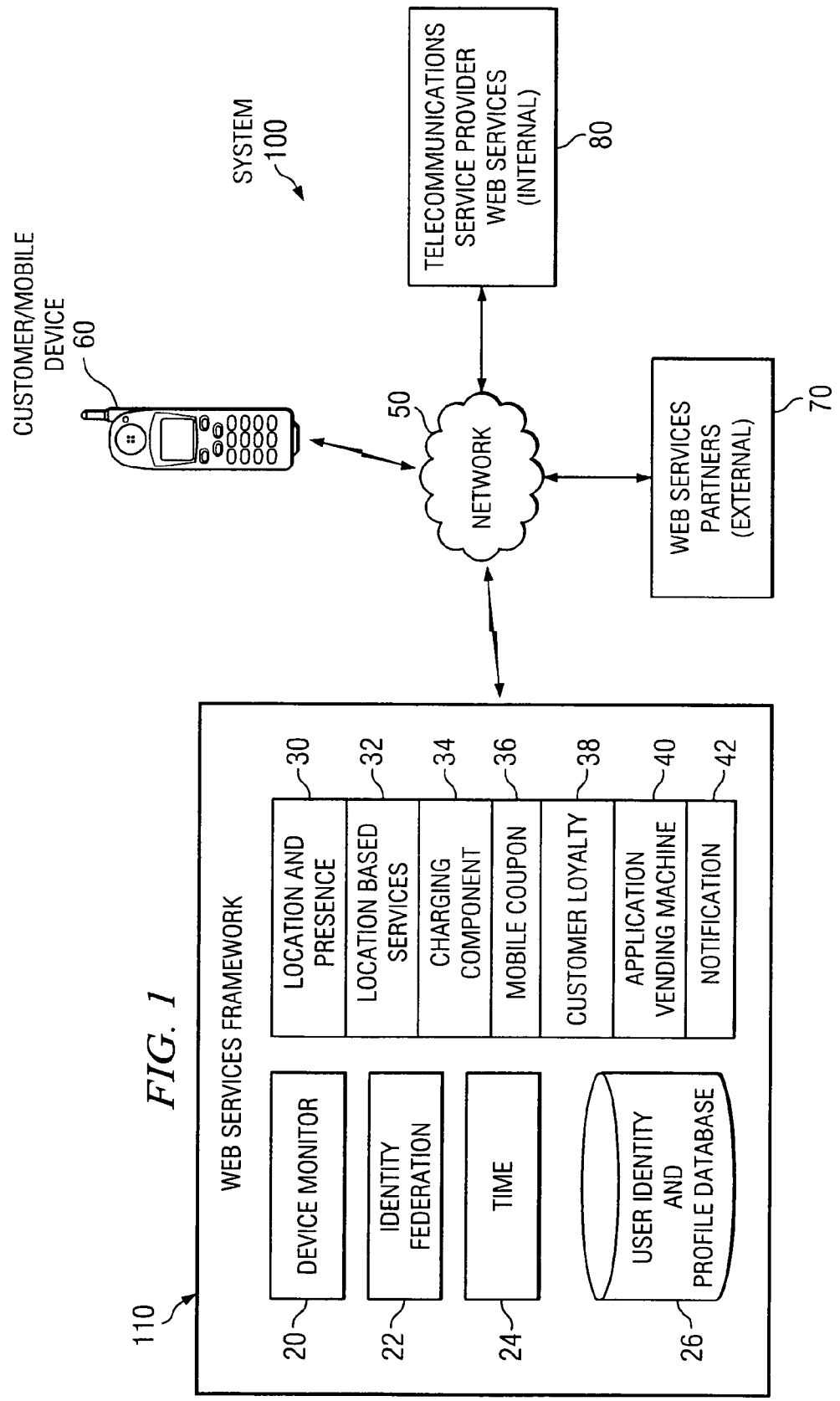
FIG. 1 is a block diagram that depicts a telecommunications architecture system and method for the rapid design, development and deployment of web services.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

In recent years, mobile phones and various portable communication devices, such as pagers, desktop and palmtop computers, personal digital assistants (PDAs), and other telephone or hand-held wireless communication devices have become increasingly important to society and commerce. The applications content available for mobile device customers currently include short message service, e-mail, news, weather, financial information, e-commerce, and other services and information sources. These mobile devices have always enjoyed wide acceptance in many application areas due to their underlying advantage of powerful computing capabilities in a simple, inexpensive and portable form. However, the mobile device has developed into a device capable of handling voice, image and data through telephony voice and data networks. These enhancements have made it possible to deliver a number of custom solutions to the global population in emerging ways. Because of the explosive growth in the mobile device marketplace, there exists a need for seamless integration of access methods using multiple types of devices and content hosts, i.e., convergence of mobile web services, in providing comprehensive information and service environment for customers.

In an embodiment, the current system provides a set of architectural components that facilitate rapid design, development, deployment and support of mobile internet applications with reduced customized programming, improved reuse of software components and compliance with standard development frameworks. The number of potential products that can be built using the software development environment is considerable. Some embodiments of the present disclosure seek to maximize the use of existing components to eliminate repetition and thereby reduce development time. It is not possible for any one enterprise to develop all of the applications that are demanded by the marketplace. However, the telecommunications service provider has many of the features for which web services may be developed. The present disclosure provides a framework for the rapid development of enterprise web services. The framework includes a library of business components that are required for the development of web services. These business components are the infrastructure that can be understood as a blueprint to enable and support the rapid design, development and deployment of component based web services. The framework leverages the creation of web services whether the web services are the telecommunications service provider's web services or a third party's web services. For the purposes of this disclosure, the term web services includes the internal telecommunications service provider web services, the third party web services and any combination of telecommunications service provider and/or third party web services.

Various software tools are used in the development of web services applications such as Microsoft .Net Studio, Sun Net Beans or other similar tools known to one of ordinary skill in the art. However, not all of the building blocks for web services are readily available. Although the application development tools exist as mentioned above, the applications are incomplete without the web services framework. Web services framework permits the telecommunications service provider to provide web services to customers and pass information between its web services partners. For example, assume a customer has elected to receive weather information based on their current location. First, certain technical issues must be addressed including mobile device identification, determining the location of the mobile device and providing identity profile information to the web services partners. A web service typically performs all of the underlying work and provides results in a format that is tailored to the individual customer's needs. Identified in this disclosure is a suite of components that will aid in the development of telecommunication web services applications. Thus the present disclosure, in one embodiment, leverages the combination of the software tools for building web services applications with the framework of components to support the web services.

Turning now to FIG. 1, a block diagram illustrates one embodiment of system 100. The system 100 includes web services that may be external or internal, may be the telecommunications service provider's web services 80 or third party web services 70, may include mobile devices 60, may include networks 50 like the internet, and includes the web services framework 110. The web services framework 110 includes one or more components which may be part of system 100. The web services framework 110 includes component that are available to pass data back and forth to web services partners 70 in the acquisition, delivery, and marketing of potential web services. The web services framework 110 will be leveraged by a telecommunications service provider and most likely reside as a part of a telecommunications service provider system. The system 100 includes various telecommunication and information technology components. The system 100 includes a web services framework 110 which may include one or more computer systems or networks of computer systems of a business enterprise as well as the software, applications and systems operable on those computers.

The system 100 illustrates a telecommunication network 50 which may be or include a standard wired telephone network, analog, digital or other wireless telecommunication networks, the Internet, or any network operable for voice, data, video or other communication or telecommunication, or variations or combinations thereof. In the present embodiment, the network 50 is operable, either alone or in concert with other systems to obtain location and identity information. The mobile device 60 is illustrated herein as a mobile telephone, although other devices could be used, such as mobile data terminals, laptops, PDAs, and other devices or combinations of devices. Illustrating the embodiments of the disclosure with a mobile phone is not intended to limit the disclosure to such handheld voice oriented devices, but only illustrate exemplary applications. The principles of the disclosure apply to any mobile computing apparatus, including those applications involving computers integrated into vehicles, including computerized location mapping display systems. Similarly, a variety of wireless protocols could be adapted to implement the principles of the present disclosure.

In the preferred embodiment, the location and presence component 30 is used to determine the Global Positioning System (GPS) location or tower location of the mobile device 60 and to determine whether the phone is active and in range of the network 50. The location and presence component 30 is an internally hosted web service that the telecommunications service provider exposes to the web services partners 70. Thus, any web services partners 70 that desire to use location and presence data in its application will use the location and presence component 30 for this information. A customer may request information based on their geographical location for a variety of applications. The geographical location of the customer is assumed to be proximate to the mobile device 60 (e.g., the customer is holding the mobile device 60), so that for practical applications the location of the mobile phone and customer are treated as the same. The location of the mobile device 60 is obtained, for example, by using GPS technology implemented within the mobile device 60 to obtain its location coordinates. The location information is communicated to the network 50 in addition to a request triggering the information download. A device monitor 20 detects the request and communicates with the location and presence component 30 to determine the location of the mobile device 60. In one embodiment, the device monitor 20 may be a network authentication component operable to for network authentication. In another embodiment, other means for determining the location of the mobile device 60 may be used and may refer to a collection of systems or subsystems.

To refrain from giving away web services for free, web services developers typically require some kind of authentication before access is permitted to their web services. When a customer uses the mobile device 60, the mobile device 60 negotiates a communication session with the network 50 and in doing so authenticates the mobile device 60 as a legitimate telecommunications service provider's mobile device 60. The mobile device 60 can then be matched with a legitimate telecommunications service provider account to obtain the customer information such as name, address, phone number and other similar data. The identity federation component 22 uniquely identifies the mobile device 60 and shares the information with web partners so that a customer may use the web services partners' 70 service without having to logon to multiple web sites. For example, a customer would not have to type in a user ID and password at the web services partners' 70 yellow pages web site or other similar web sites because the identity federation component 22 authenticated the customer information prior to passing the information to the web services partners 70.

The federated information may be a token that is passed between systems or other similar methods may be used that are well known to one skilled in the art. Federating information with the web services framework allows the web services partners 70 to determine the type of mobile device 60, customer billing preferences, customer identification, location of mobile device 60 and other similar information. The federated information provides all of the data that is needed for the web services partners 70 to provide web services to the customer. For example, when the web services partners request information from the telecommunications service provider, the telecommunications service providers retrieves information such as the customer's name, address, account number, type of mobile device 60, mobile device 60 location and other similar data and packages the information into a token that is sent to the web services partners 70. The web services partners 70 can open and use the information to provide web services to the customer.

There are many situations where the customer's identity and other pertinent information are needed to provide services to the customer. The user identity and profile database 26 is an internally hosted web service that may be exposed to web services partners 70 as a carrier class web service. The customer identity and profile information is stored in a database that is maintained and updated by the customer via either the internet or the mobile device 60. The database includes such information as the customer's name, address, telephone number, sex, age and identifies the services associated with a particular customer. The database may also include customer usage information and whether the customer is willing to accept advertisements from a third party.

The time component 24 is used to keep a universal time throughout the network 50 that is current and up-to-date. This is also the case for each mobile device 60 because the time clock on the mobile device 60 is synchronized each time the device connects to the network 50. The time captured by the time component 24 is relative to the customer's time zone, country and is also sensitive to daylight savings and other similar factors. This information can be critical where events are captured without communicating to external servers. For example, to the extent an application that runs on the mobile device 60 is storing information and events related to customer activity for later propagation to a server, the local timestamps may be used for tracking, reporting, auditing, verification (such as of purchases), or for a multitude of other purposes.

In the present embodiment, location based services component 32 is operable to provide services such as location capability, navigation assistance, real-time traffic advisories, directory assistance, roadside assistance, business or residential assistance, information services assistance, emergency assistance, and communications assistance. A typical application of customer-specific location information is providing location based services to the customer. In a location based service, the customer elects to receive a particular type of location dependent information and this requires the network 50 to identify the customer. By definition, location based services 32 provide service only to a limited subset of customers and do not provide the service generally to all subscribers. Thus, identification of the customer is helpful in these instances.

The generic request describes the scenario when the service request and information download does not require identification of the customer making the request. Generic services are usually used when all customers making the request for information receive the same requested information. Services which are location based are generally not generic based. Generic information download is used when a business at a given location desires to make certain information available to any customer making a request for information. For example, the network 50 may download information about a business (e.g., telephone contact number, hours of operation, etc.) to customers making a generic request for information at that business location (e.g. similar to advertising). In this type of application, the customer simply requests the information and the web services partners 70 responds with information associated with the business.

Finally, there are service scenarios that are considered hybrid, as they do not clearly fall within a single category. For example, some services may be provided to all subscribers, but which still require the customer's identification. A wireless service provider could define a single function key as identifying the same service across their network 50 for all subscribers. One embodiment is a generic information service that provides information to a customer about movie showings at a movie theater with the option of ordering tickets. The purchase of a ticket by a customer requires identification of the customer if a credit card is being used. This service could be considered as customer-specific since the customer's identification is provided, but the service of providing movie information could be viewed as generic, e.g., the information is not unique to the customer. In such cases, the categorization of the service is not critical, as the concept of categorization only illustrates the principles of the disclosure and is not intended to limit embodiments of the disclosure or constrain the implementation. As another example, the service illustrated is a real-time traffic status display that indicated traffic congestion on a roadmap. The traffic status display is in graphical form and is designed to provide traffic status of a limited area centered on the location of the customer making the request. A typical application of the service is to provide traffic conditions to drivers in cars equipped with mobile display devices. This could be a mobile telephone with a graphical display or an automotive computer with an integrated display device in a dashboard. The service allows the customer to obtain real-time traffic information based on the customer's current location.

Because the service embodiment is a location based service, only those authorized subscribers may receive the information. To access these services, the customer has to first open the client application. The client application connects to the partner web service 70 to obtain traffic information: the wireless device 60 connects to the wireless network 50 and is authenticated to device monitor 20. Since the web service is external, the identity federation component 22 is invoked to get identity assertions for authentication to the partner. The call is passed on to the partner web service 70. The web service 70 needs location information for the device 60 so it invokes the location based services component 32. The returned location information is used by the partner web service 70 to gather pertinent traffic information for the device location and returns it back to the wireless device 60.

In this example, the customer triggers the information download process by sending a request to the telecommunications service provider. Alternatively, an application process executing in the mobile device 60 may trigger the request, based on various criteria including the location of the device and time.

The device monitor 20 is in communication with the network 50 and/or may be operable to communicate directly with the switch or other components of the network 50. The device monitor 20 may comprise one or more systems, and may, in some embodiments, be a component of or apart from the web services framework 110. In some embodiments, the device monitor 20 may be operable to trigger an event to occur when a mobile device 60 comes in proximity to a certain location and time. In the present embodiment, the device monitor 20 communicates with network 50 or other network components or systems to obtain the time and location of the mobile device 60. For example, an enterprise may be interested to know when a customer is within certain proximity of the enterprise's business during certain hours so that it may change the computerized advertising on the storefront because it knows certain clientele are nearby.

A charging component 34 is an internally hosted web service that detects when a customer makes a purchase and passes the information to billing and/or accounting. For example, a customer may choose to pay for an item purchased using the mobile device 60. The customer can store credit card information in the mobile device 60 and transmit the credit card information directly to the point of sales system at the business. Alternatively, the customer may choose to have a charge applied to the customer's telecommunications service provider bill. The telecommunications service provider and the web services partners 70 will arrange payment of the funds. The charging component 34 would communicate with the user identity and profile database 26 to determine the customer's preferences.

A customer loyalty component 38 is an internally hosted web service that is exposed to the web service partners 70. The customer loyalty component 38 is operable to reward customer for frequenting a particular enterprise. For example, a customer may be rewarded by receiving a free sandwich after the purchase of the tenth sandwich, depending on the award program. In the present embodiment, that customer loyalty information is stored off the mobile device 60 to prevent loss of data due to powering down the device, loss of battery life or other similar events. In the present embodiment, the web services partners 70 will be able to query the customer loyalty component 38 to determine whether the customer is eligible for a reward-a free sandwich as in the above example.

A mobile coupon component 36 is an internally hosted web service that is exposed to the web service partners 70. Thus, any time the web services partners 70 have a coupon it wants to ship out to the customer, the web services partners 70 may use the mobile coupon component 36. The mobile coupon component 36 is a complete end-to-end functionality for delivery and redemption of the coupon. The web services partners 70 creates the coupon, which may be thought of as a graphic image that is downloaded to the customer's mobile device 60. The coupon is then passed to the telecommunications service provider exposed web service, which is then passed to the mobile coupon component 36 for delivery to the customer. The present embodiment provides the infrastructure that permits the coupon to be transmitted to the enterprise where the coupon is to be redeemed so that the customer may actually use the coupon. For example, a coupon the gives the customer a twenty percent discount off the customer's next purchase or the purchase of a certain item at the enterprise's store.

Many of the mobile devices 60 now allow small applications to be loaded and run on the mobile device 60. For example, a range of mobile based games exists, some of which allow for collaborative gaming over the mobile network. The application vending machine 40 is an internally hosted web service that is operable to package and deploy such mobile applications on the mobile device 60. Mobile applications are also being developed to allow customers access to remote computer systems. In the present embodiment, the telecommunications service provider has a catalog of applications that the customer can use the vending machine to browse, purchase and download to the customer's mobile device 60. Once installed on the mobile device 60, the client application is operable to act as a gateway to services provided by the web services partners 70.

The notification component 42 is an internally hosted web service that is operable to provide a customer's mobile device 60 with the notification of a text message, Short Message Service (SMS) messages or other similar services. Accordingly, the customer may receive timely notifications of incoming text messages or SMS messages regardless of the customer's location. A notification is generated corresponding to the received information. The notification is transmitted from a communication device to the mobile device 60 to display a real-time notification. If the mobile device 60 is not available, the notification is stored in a database and retransmitted to the mobile device 60 at a later time.

The system described above may be implemented on any general-purpose computer with sufficient processing power, memory resources, and network throughput capability to handle the necessary workload placed upon it. FIG. 2 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A web services architecture, comprising:
    a web services application framework that provides functional components usable by a plurality of web services provided to mobile devices, wherein the functional components include an identity federation component that identifies a mobile device;
    a telecommunications provider system that hosts the web services application framework and federates information from the functional components; and
    a service provider that provides at least one of the plurality of web services to the mobile device and requests information from the telecommunications provider system utilized by the service provider in providing the at least one of the plurality of web services,
    wherein the telecommunications provider system federates the requested information by using the identity federation component and at least two of the functional components of the web services application framework,
    wherein the at least two of the functional components perform functions to determine at least a portion of the federated information that is usable by the at least one of the plurality of web services thereby relieving the at least one of the plurality of web services from performing the functions performed by the at least two of the functional components;
    wherein the telecommunications provider sends the federated information to the service provider, and
    wherein the service provider uses the federated information to provide a mobile device web service to the mobile device.

2. The web services architecture of claim 1, wherein the at least two of the functional components includes a location component that determines a location of the mobile device.

3. The web services architecture of claim 1, wherein the at least two of the functional components includes a coupon component that delivers a coupon from the service provider to the mobile device.

4. The web services architecture of claim 1, wherein the federated information is used by the service provider to identify the mobile device as being associated with the telecommunications provider.

5. The web services architecture of claim 1, wherein the federated information is used by the service provider to charge a customer of the mobile device based on the mobile device web service.

6. The web services architecture of claim 1, wherein the federated information is used by the service provider to determine whether the customer of the mobile device has authorized use of other customer information related to the mobile device service.

7. The web services architecture of claim 6, wherein the other customer information includes one of accounts related to the mobile device service, personal preferences of the customer, and payment means.

8. The web services architecture of claim 1, wherein the at least two of the functional components includes a user identity and profile component that includes information about a customer of the mobile device.

9. The web services architecture of claim 8, wherein the information about the customer includes one of a personal customer information, and an identifier uniquely identifying the mobile device.

10. The web services architecture of claim 1, wherein the at least two of the functional components includes a time component that maintains a universal time for the telecommunications provider system and the mobile device.

11. The web services architecture of claim 1, wherein the at least two of the functional components includes a presence component that determines whether the mobile device is active and within range of a network in communication with the telecommunications provider system.

12. The web services architecture of claim 1, wherein the federated information is a token passed between the telecommunications provider and the service provider.

13. A method of providing web services, comprising:
- hosting, by a telecommunications provider, a web services application framework, wherein the web services application framework includes functional components usable by a plurality of web services;
- receiving, by the telecommunications provider, a request from the service provider for information needed for the service provider to provide the web service to the mobile device;
- invoking at least two functional components in the web services application framework to perform functions to determine at least a portion of the information;
- federating the information determined by the at least two functional components; and
- providing the federated information to the service provider to support the mobile device web service.

14. The method of claim 13, wherein the at least two functional components include a location component that determines a presence and a location of a mobile device.

15. The method of claim 14, wherein the at least two functional components include a user identity and profile component that includes information about a customer of the telecommunications provider.

16. The method of claim 15, wherein the at least two functional components include a time component that maintains a universal time for the telecommunications provider.

17. The method of claim 16, wherein the at least two functional components include a coupon component that delivers a coupon from the service provider to the mobile device.

* * * * *